(12) United States Patent
Arnold et al.

(10) Patent No.: US 10,112,774 B2
(45) Date of Patent: Oct. 30, 2018

(54) SHUTTLE WAVE SEQUENCING CONVEYOR

(71) Applicant: Intelligrated Headquarters, LLC, Mason, OH (US)

(72) Inventors: Christopher C. Arnold, Loveland, OH (US); David Huff, Batavia, OH (US); Mark D. Steinkamp, Mason, OH (US); Steven Plothow, Taylorsville, UT (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 35 days.

(21) Appl. No.: 15/185,389

(22) Filed: Jun. 17, 2016

(65) Prior Publication Data

US 2017/0050803 A1 Feb. 23, 2017

Related U.S. Application Data

(60) Provisional application No. 62/221,674, filed on Sep. 22, 2015, provisional application No. 62/193,920, filed on Jul. 17, 2015.

(51) Int. Cl.
*B65G 1/137* (2006.01)
*B65G 47/71* (2006.01)
(Continued)

(52) U.S. Cl.
CPC ......... *B65G 1/1373* (2013.01); *B65G 1/0485* (2013.01); *B65G 1/0492* (2013.01);
(Continued)

(58) Field of Classification Search
CPC ...... B65G 1/06; B65G 1/1378; B65G 47/643; B65G 47/64; B65G 47/52
See application file for complete search history.

(56) References Cited

U.S. PATENT DOCUMENTS 3,528,566 A * 9/1970 Weir .................... B65G 1/1378
   187/244
5,215,421 A   6/1993 Smith
   (Continued)

FOREIGN PATENT DOCUMENTS

EP   0373060 A1   6/1990
EP   1010647 A1   6/2000
   (Continued)

OTHER PUBLICATIONS

International Search Report and Written Opinion of International Searching Authority for International Patent Application No. PCT/US2016/041999 dated Oct. 5, 2016, 16 pages.

*Primary Examiner* — Mark C Hageman
(74) *Attorney, Agent, or Firm* — Alston & Bird LLP

(57) ABSTRACT

A material handling system has an automated storage and retrieval system (AS/RS) with vertically spaced levels storing articles. Each level has at least one pickup and deposit (P/D) station serviced by a shuttle and that is horizontally positioned to define a ramped orientation with a wave conveyor to move products selectively in at least one flow direction to each of the P/D stations. An article transfer mechanism at each P/D station respectively moves an article in a selected at least one direction between the wave conveyor and the respective P/D station. A controller selectively moves the selected articles onto the wave conveyor by respective article transfer mechanisms in coordination with movement of the wave conveyor to create a sequenced flow of selected articles. An order preparation system can receive the sequenced flow.

9 Claims, 18 Drawing Sheets

(51) Int. Cl.
*B65G 1/04* (2006.01)
*B65G 1/06* (2006.01)
B65G 47/53 (2006.01)
B65G 47/57 (2006.01)

(52) U.S. Cl.
CPC ............ *B65G 1/06* (2013.01); *B65G 1/1378* (2013.01); *B65G 47/71* (2013.01); *B65G 1/065* (2013.01); *B65G 47/53* (2013.01); *B65G 47/57* (2013.01); *B65G 2201/0258* (2013.01)

(56) References Cited

U.S. PATENT DOCUMENTS

| | | | |
|---|---|---|---|
| 6,357,985 B1 * | 3/2002 | Anzani | B65G 1/08 193/35 R |
| 2005/0186053 A1 * | 8/2005 | Itoh | B65G 1/0478 414/285 |
| 2009/0074545 A1 | 3/2009 | Lert, Jr. | |
| 2010/0300842 A1 | 12/2010 | Bastian, II et al. | |

FOREIGN PATENT DOCUMENTS

| | | |
|---|---|---|
| JP | S5912001 A | 1/1984 |
| JP | S61140402 A | 6/1986 |

\* cited by examiner

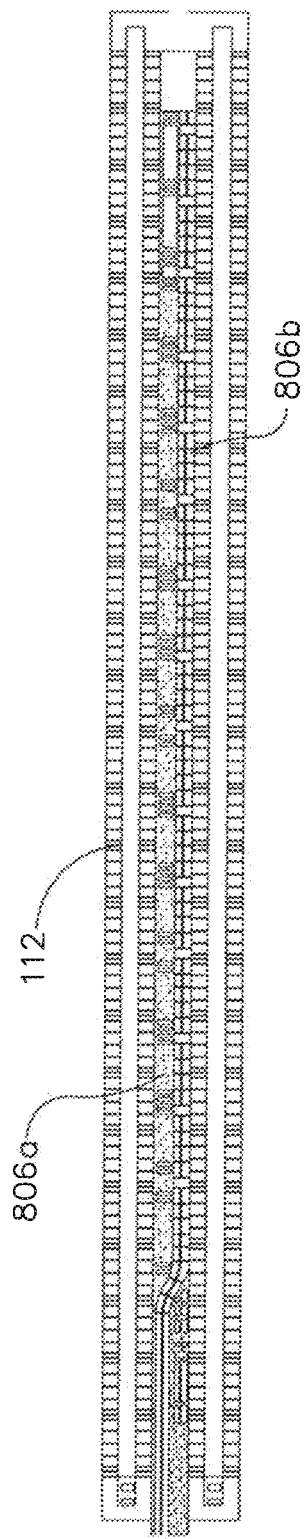
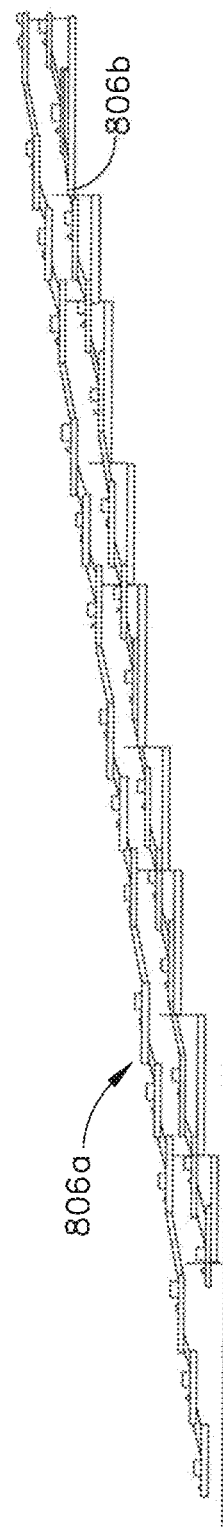
FIG. 8A
FIG. 8B

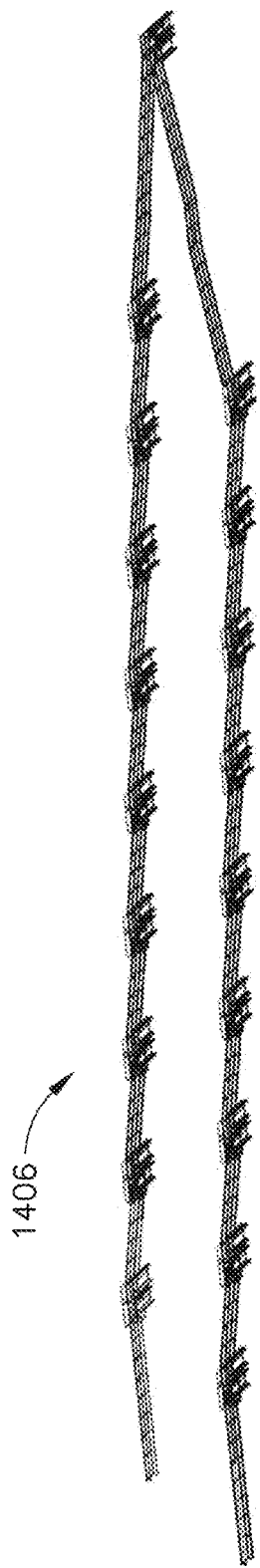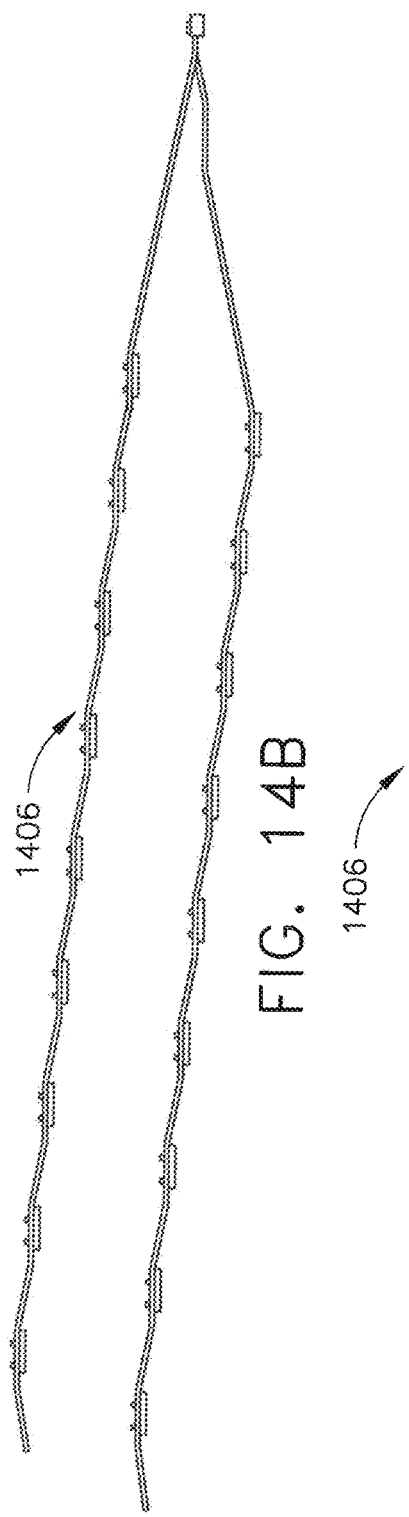

SHUTTLE WAVE SEQUENCING CONVEYOR

CLAIM OF PRIORITY UNDER 35 U.S.C. § 119

The present Application for Patent claims priority to Provisional Application Ser. No. 62/193,920 filed 17 Jul. 2015, No. 62/221,674 filed 22 Sep. 2015, and Ser. No. 62/240,120 filed 12 Oct. 2015, all entitled "Shuttle Wave Sequencing Conveyor" and assigned to the assignee hereof and hereby all expressly incorporated by reference herein.

FIELD OF THE INVENTION

The present disclosure relates generally to automated storage/retrieval systems (AS/RS), and more specifically to sequencing product out of the AS/RS for palletizing or order fulfillment.

BACKGROUND

AS/RS systems are designed for automated storage and retrieval of parts and items in manufacturing, distribution, retail, wholesale and institutions. They first originated in the 1960s, initially focusing on heavy pallet loads but with the evolution of the technology the handled loads have become smaller. The systems operate under computerized control, maintaining an inventory of stored items. Retrieval of items is accomplished by specifying the item type and quantity to be retrieved. The computer determines where in the storage area the item can be retrieved from and schedules the retrieval. It directs the proper automated storage and retrieval machine (SRM) to the location where the item is stored and directs the machine to deposit the item at a location where it is to be picked up. A system of conveyors and or automated guided vehicles, such as shuttles, are sometimes part of the AS/RS system. These take loads into and out of the storage area and move them to the manufacturing floor, loading docks, palletizer, or order fulfillment station. To store items, the pallet or tray is placed at an input station for the system, the information for inventory is entered into a computer terminal and the AS/RS system moves the load to the storage area, determines a suitable location for the item, and stores the load. As items are stored into or retrieved from the racks, the computer updates its inventory accordingly.

The benefits of an AS/RS system include reduced labor for transporting items into and out of inventory, reduced inventory levels, more accurate tracking of inventory, and space savings. Items are often stored more densely than in systems where items are stored and retrieved manually. The trend towards Just In Time production often requires sub-pallet level availability of production inputs, mixed pallet outputs, or e-commerce order fulfillment, and AS/RS is a much faster way of organizing the storage of smaller items next to production lines.

One AS/RS technology is known as shuttle technology. In this technology the horizontal movement is made by independent shuttles each operating on one level of the rack while a lift at a fixed position within the rack is responsible for the vertical movement. By using two separate machines for these two axes, the shuttle technology is able to provide higher throughput rates than stacker cranes and multi-level shuttles. Storage and Retrieval Machines pick up or drop off loads to the rest of the supporting transportation system at specific stations, where inbound and outbound loads are precisely positioned for proper handling.

Often the vertical lift can be the limiting item with regard to overall throughput of the AS/RS system. Each vertical lift is also a significant portion of the cost of overall AS/RS solution. Adding additional vertical lifts can make the resulting solution too expensive and with an insufficient return on investment to implement.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with a material handling system including an automated storage and retrieval system (AS/RS) having vertically spaced levels storing articles and each level having at least one pickup and deposit (P/D) station that is horizontally positioned to define a ramped orientation. A wave conveyor has the ramped orientation to move products selectively in at least one flow direction to each of the P/D stations. An article transfer mechanism at each P/D station respectively moves an article in a selected at least one direction between the wave conveyor and the respective P/D station.

In one aspect, a method is provided of sequencing articles from an AS/RS of a material handling system. In one or more embodiments, the method includes conveying articles on a wave conveyor that proximally intersects a plurality of levels of the AS/RS. The method includes selectively placing an article from a P/D station onto the wave conveyor to form a sequenced flow. The method includes delivering the sequenced flow to an order preparation system.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 8A illustrates a diagram of a top view of dual stacked wave conveyors, according to one or more embodiments;

FIG. 8B illustrates a diagram of a side view of the dual stacked wave conveyors of FIG. 8A, according to one or more embodiments;

FIGS. 14A-14D illustrate an isometric view, side view, top view, and front view respectively of a reduced-length wave conveyor folded back at its midpoint, according to one or more embodiments;

DETAILED DESCRIPTION

Figure 1A:
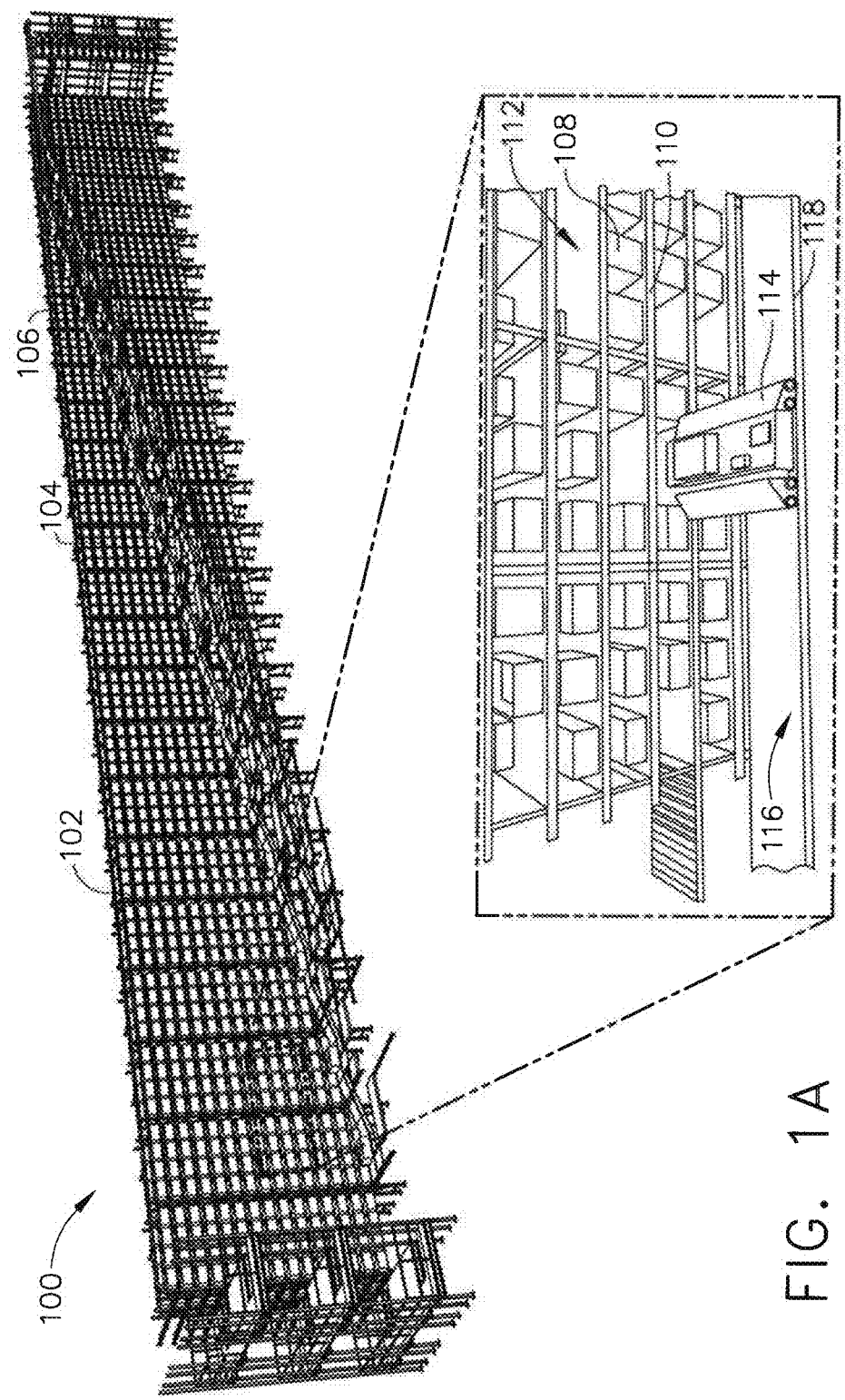
FIG. 1A illustrates a depiction of an isometric view of an automated storage and retrieval system (AS/RS) solution that includes a wave conveyor, according to one or more embodiments.

"The Wave" is a way to bring product out of a shuttle system instead of using a vertical lift in order to achieve a higher throughput as well as other advantages. A wave conveyor in combination with an automated storage and retrieval system (AS/RS) such as a shuttle system can prove sequencing across one or more pallets or separate orders at the same time. Typically when sequencing with a reciprocating lift, throughput is significantly reduced. With the wave, simulation has shown that there is almost no reduction in rate of sequenced articles. The wave conveyor can provide service for articles such as pallets, cases, cartons or totes a single packaged or unpackaged product.

One wave conveyor can service multiple aisles of a shuttle rack system. Alternatively or in addition, one wave can service a single aisle. A wave conveyor can be used to just take things away or to just bring things in with the reverse direction serviced by another wave conveyor or by a vertical lift. Alternatively or in addition, a wave conveyor can be used selectively to bring in product or to take away on the same line at different times respectively. To achieve even higher throughput, two wave conveyors can be stacked with offset pickup and deposit (P&D) stations on a particular aisle.

P&D stations can be provided by embedding P&D conveyors within the storage rack down the length of the aisle. Independent buffer and transfer positions provide full P&D functionality. In one or more embodiments, the transfer and buffering capability can be equivalent to what is provided for vertical lifts. Number of buffer locations provided can be from 1 to "N" and can be independent of the wave. Each P&D transfer level connects to an inclined conveyor. Each level of the AS/RS can be independent. Inclined or declined conveyor can provide a reliable trunk line for all inbound and outbound loads with high load capacity. Inbound and outbound product flows can be serviced by separate conveyor levels. Faults in one area do not impact operation for the rest of the system.

In coordination with control of shuttles of the shuttle rack system, a wave conveyor can sequence the product on the way out in order to efficiently supply a palletizer or an order fulfillment system such as a goods-to-operation (GTO) station. For example, a shuttle assigned to a level can be responsible for pulling in the sequence assigned to that level, which can include buffering locations at that level. The wave conveyor combines the inputs from each level into the desired sequence by controlling the release of product onto a trunk line of the wave conveyor. For example, a warehouse management system (WMS) can (a) assign release windows for each level; (b) hold product on the trunk line until the desired load is available; and (c) only release when all lower priorities have gone past. In one or more embodiments, sequencing by the WMS does not have to be strict.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1B:
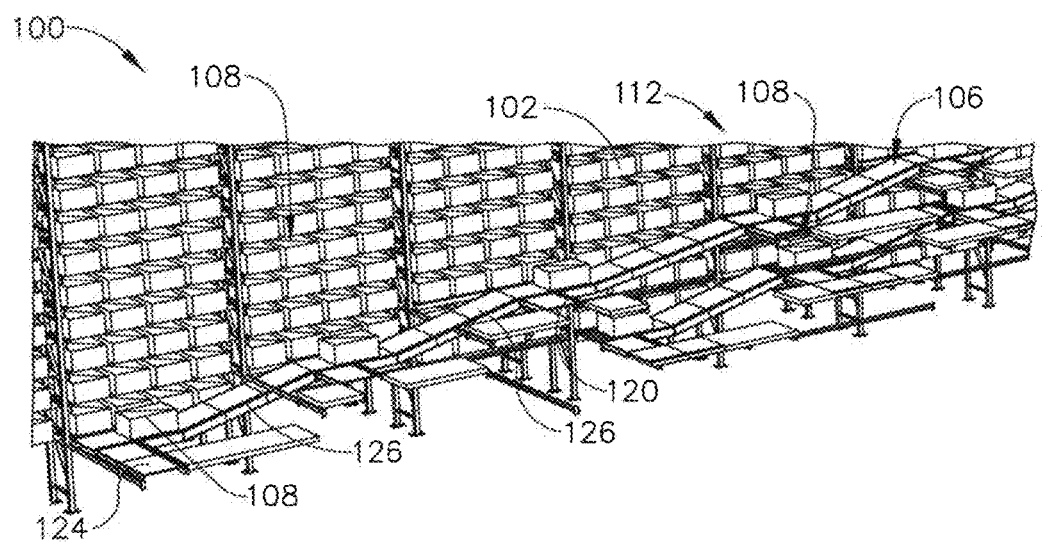
FIG. 1B illustrates a depiction of a front detail view of the AS/RS and wave conveyor of FIG. 1A, according to one or more embodiments.

FIGS. 1A-1B illustrate a material handling system 100 having an automated storage and retrieval system (AS/RS) 102 with at least one storage bay 104 serviced by a wave conveyor 106. Articles 108 such as cartons, totes, cases, pallets, products, etc., are stored on shelves 110 in a rack system 112 of the AS/RS 102. FIG. 1A illustrates a single-level shuttle 114 that services a shelf 110 on one or both sides of an aisle 116 defined by electrified rails 118 attached to the rack system 112. Wave conveyor 106 is separated from the shuttles 114 and receives articles 108 from a Pick Up & Deposit (P&D) station 120 at a juxtaposed position on a shelf 110. In some embodiments, more than one shelf along the aisle 116 can be serviced by a multi-level shuttle (not shown) or a single-level shuttle 114 that has a means for roaming to another level (e.g., vertical lift, inclined rails, etc.).

Figure 1C:
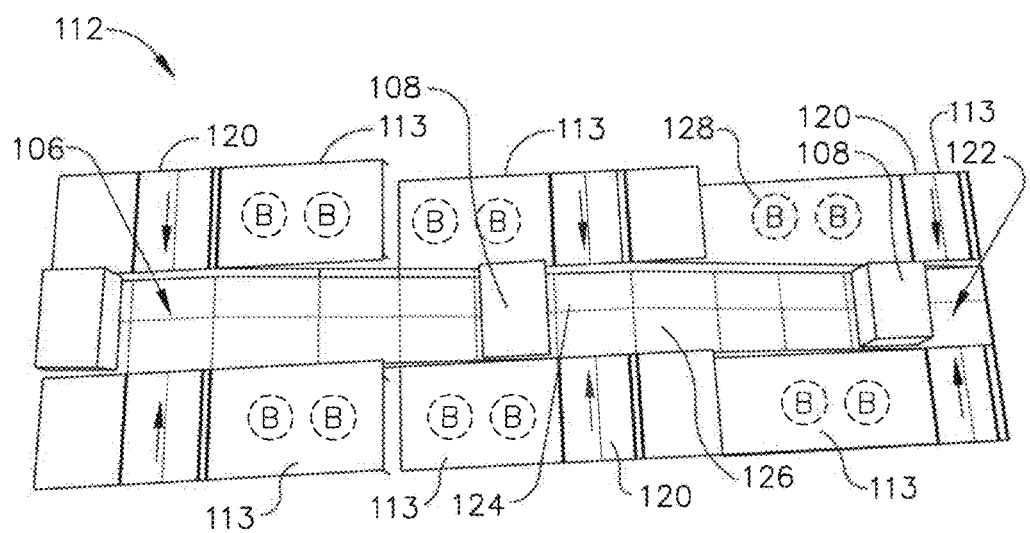
FIG. 1C illustrates a depiction of a top isometric view of the wave conveyor of FIG. 1A, according to one or more embodiments.
Figure 2:
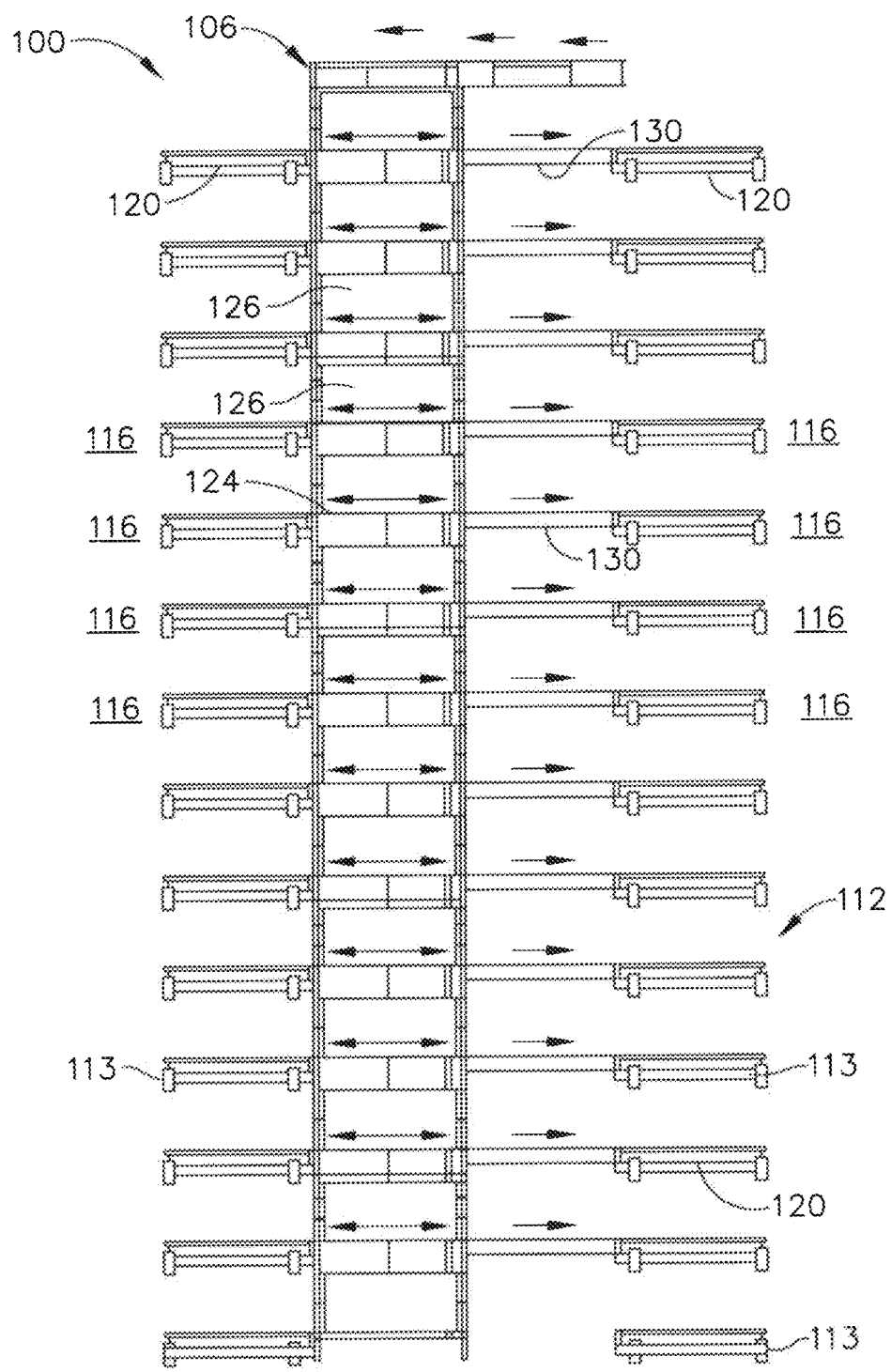
FIG. 2 illustrates a diagram of a front view of the wave conveyor of FIG. 1A, according to one or more embodiments.
Figure 3:
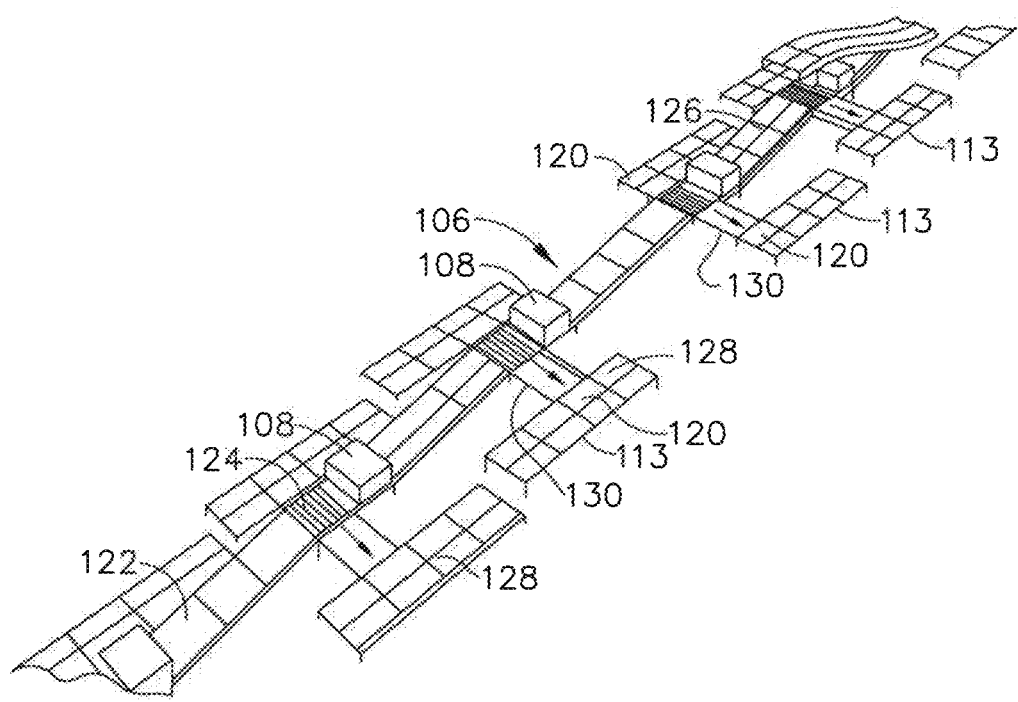
FIG. 3 illustrates a diagram of an isometric view of the wave conveyor of FIG. 1A, according to one or more embodiments.
Figure 4:
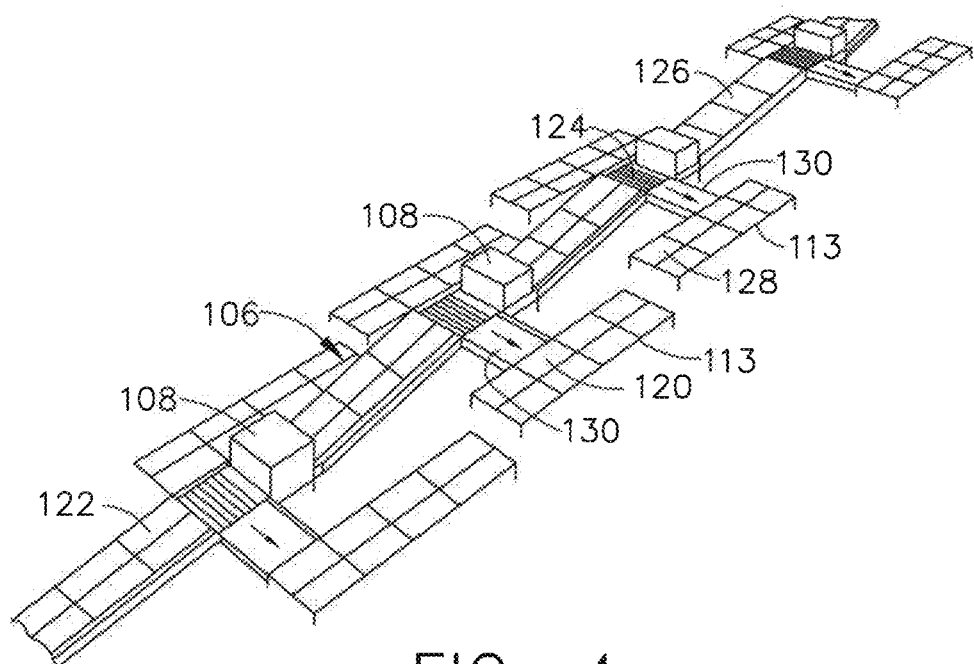
FIG. 4 illustrates a diagram of an isometric view of the wave conveyor of FIG. 1A, according to one or more embodiments.
Figure 5:
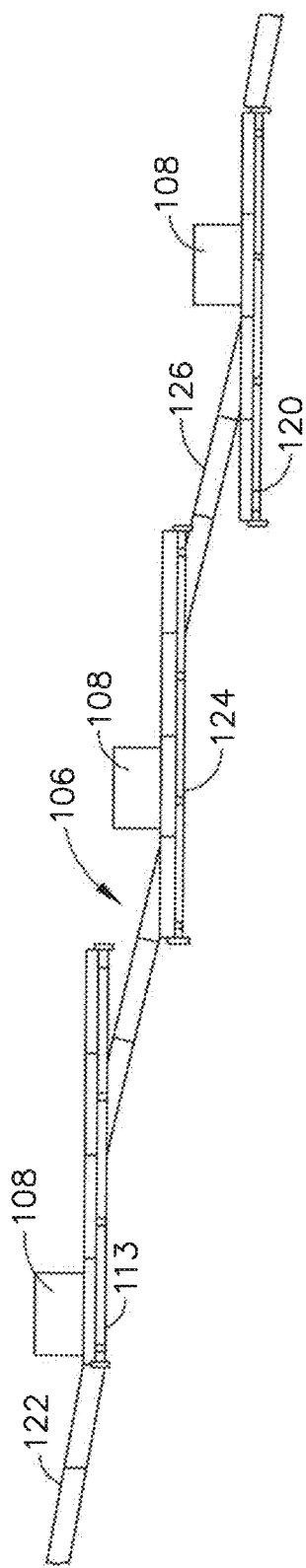
FIG. 5 illustrates a diagram of a side view of the wave conveyor of FIG. 1A, according to one or more embodiments.
Figure 6:
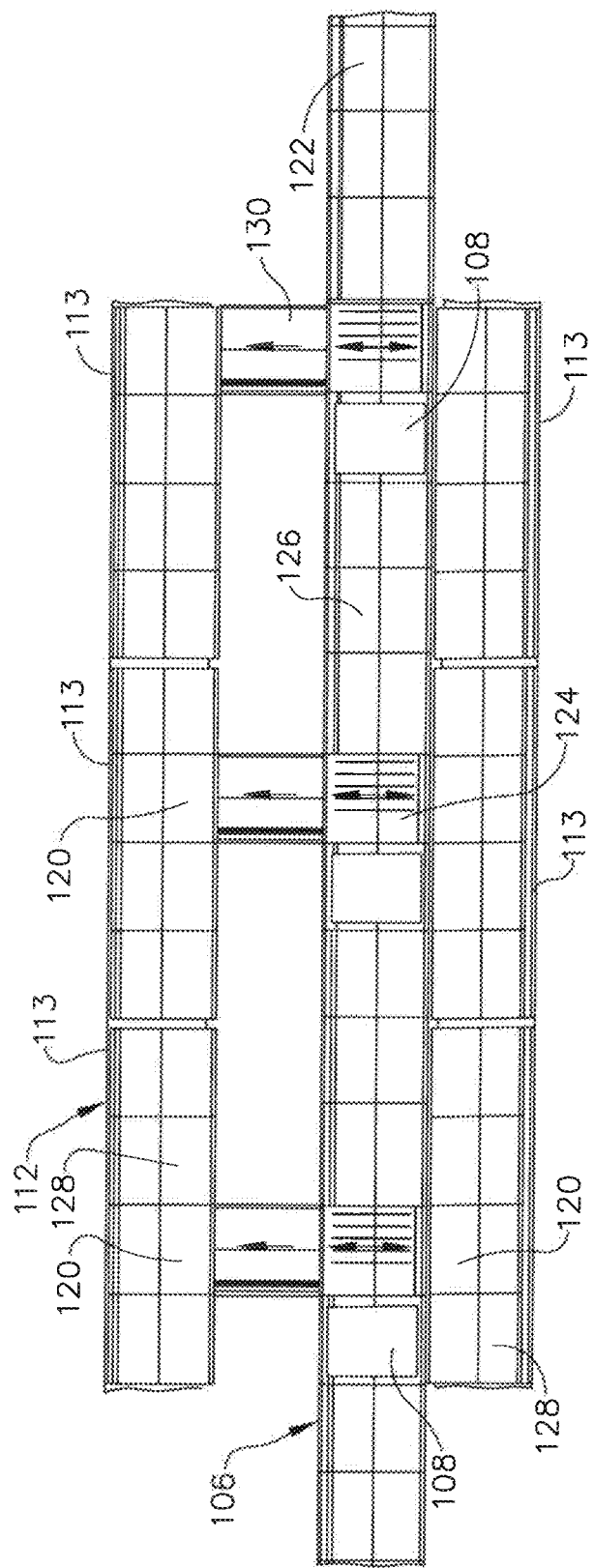
FIG. 6 illustrates a diagram of a top view of the wave conveyor of FIG. 1A, according to one or more embodiments.
Figure 7:
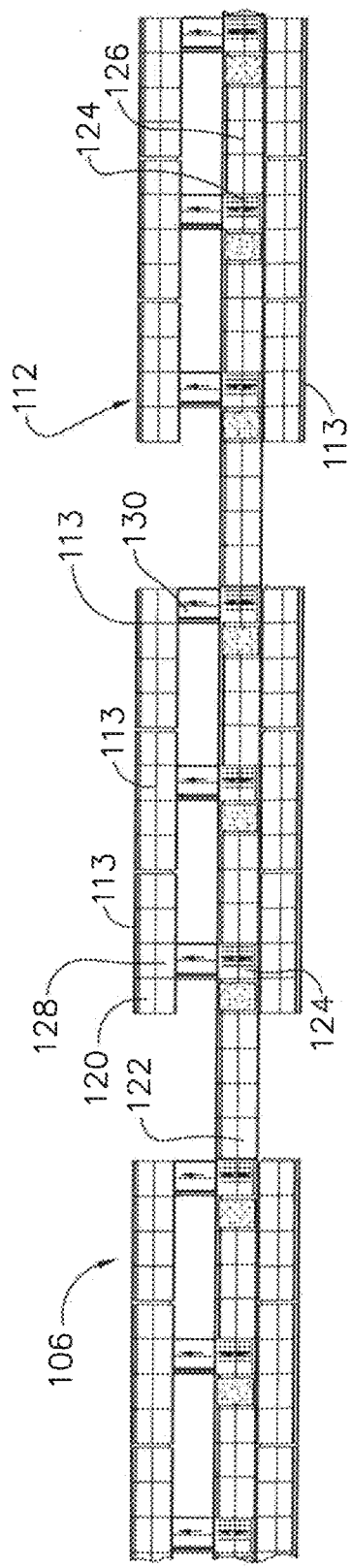
FIG. 7 illustrates a diagram of a top view of the wave conveyor of FIG. 1A, according to one or more embodiments.

FIGS. 1B-1C illustrate that the wave conveyor 106 can run up an incline or down a decline to discharge respectively at the top or bottom. For clarity, the wave conveyor 106 is assumed to run down such that all loads move downhill. Loads join a main trunk line 122 on a flat transfer section 124 between decline sections 126. Transfer section 124 can be located at different locations with respect to the storage bay 104 as the trunk line 122 travels down. Conveyor decline angle and length can be varied to accommodate different bay sizes. P&D stations 120 transfer articles 108 onto and/or off of the trunk line 122 at a juxtaposed flat transfer section 124. FIG. 1C illustrates that the P&D station 120 on three respective shelves 113 can be flanked with buffer location/s 128 to enable staging of additional articles 108 for sequencing onto the trunk line 122 or for receiving from the trunk line 122 until taken away for storage. FIGS. 1C further illustrates that this particular configuration can have a series of three different transfer locations with respect to the storage bay, then a long section of conveyor at a different decline angle where the pattern then repeats.

FIGS. 2-7 illustrate that a transfer section 124 can abut the storage shelf 113, or it can be connected with an extender conveyor 130. An extender conveyor 130 can accommodate space for maintenance catwalk/access. Product (articles 108) is typically accumulated on the trunk line 122. For sequencing, loads (products, articles 108) can be stopped upstream of the transfer section 124 (if required) to ensure sequence integrity.

In one or more embodiments, two shuttle vehicle aisles can provide storage on either side of the wave conveyor. Storage can be either single or multi-deep. The wave conveyor travels down the middle between the two aisles. In this case, there are 2 trunk lines, one for inbound and one for outbound stacked on top of each other.

FIGS. 8A-8B illustrate two stacked wave conveyors 806a, 806b. If two trunk lines are used, they do not have to be stacked, but can be offset from each other. Notice offset of inbound and outbound tie-ins for a specific level to allow for load clearances with stacked conveyors. In a single trunk line configuration, this offset is not required.

In one or more embodiments, vertical lifts can also be included with the wave conveyor providing a backup or surge capability.

Figure 9:
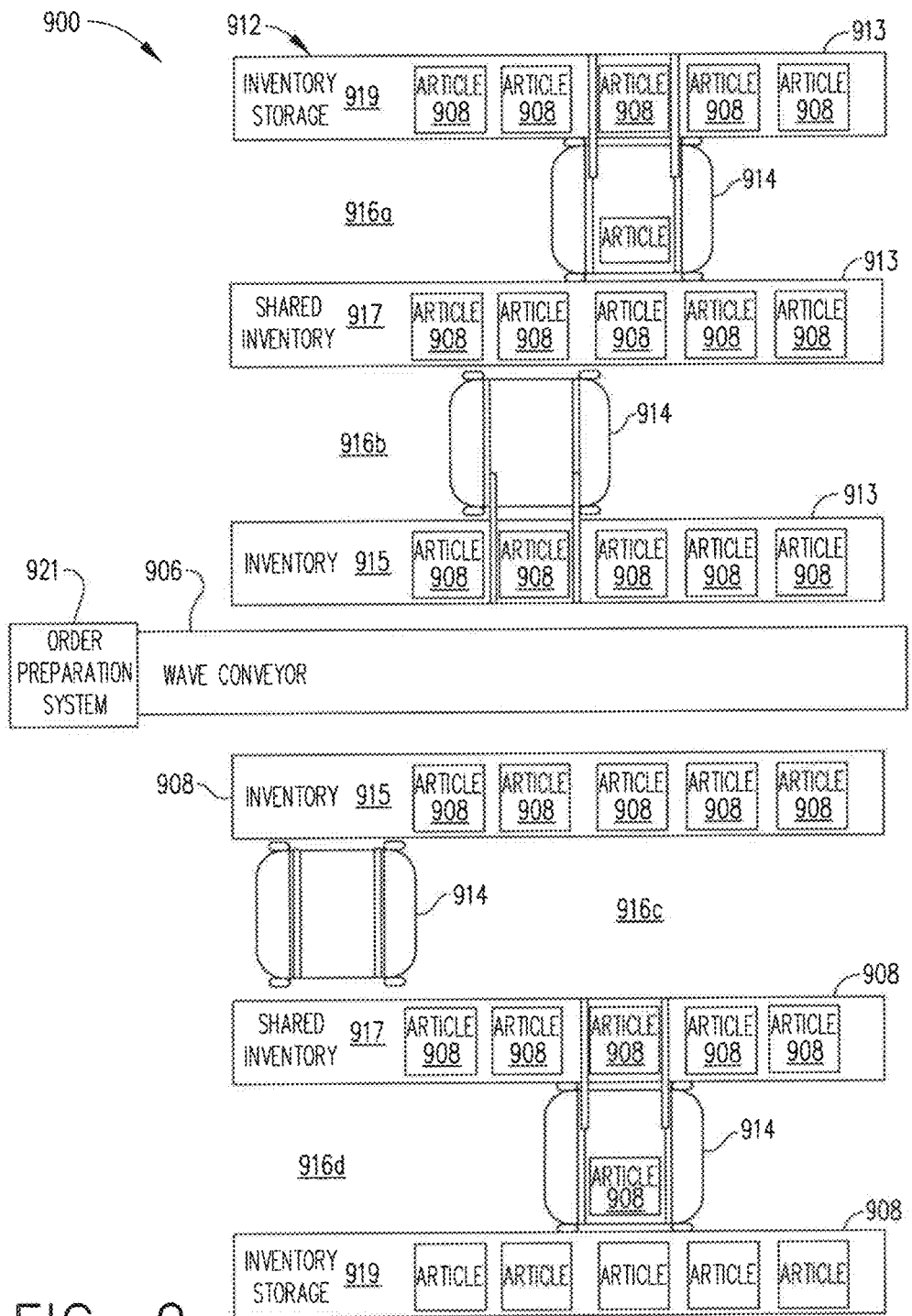
FIG. 9 illustrates a diagram of a tiered AS/RS for a high throughput wave conveyor, according to one or more embodiments.

FIG. 9 illustrates an AS/RS 900 that addresses a challenge that shuttle vehicles 914 may be very busy picking the right inventory in the right sequence and delivering it to the wave conveyor 906. For example, to provide for full capacity palletizing, typically a (relatively) large storage base is required (typically long aisles). However, shuttle vehicle availability decreases as aisles 916a-916d lengthen due to longer travel times. Thus, shuttle vehicles 914 can require significant time managing inventory (e.g., shuffles, replenishment, etc.) versus delivering to inventory locations 915 on a shelf 913 closest to the wave conveyor 906. To increase the number of unique storekeeping units (SKUs) that can be selected, in one embodiment an aisle 916b-916c closest to the wave conveyor 906 is serviced by a shuttle vehicle 914 that can receive article from another shuttle vehicle 914 in another aisle 916a, 916d, respectively, that is farther away from the wave conveyor 906. For example, the concept can be extended to yet further aisles (not shown). Thereby, slow moving SKUs that are infrequently requested for inclusion in a sequenced flow can be stored deeper into a rack system 912 in inventory storage locations 919 of an AS/RS 900 with fast moving SKUs positioned in closer aisles 916b-916c for faster throughput by the AS/RS 900. Thus, the concept is to add a second set of shuttle vehicles 914 "behind" the first set with shared inventory locations 917 between. The second set of shuttle vehicles 914 can stock inventory (articles 908) in remote inventory storage locations 919 without burdening the sequenced delivery to the wave conveyor 906. The wave conveyor 906 sequences articles 908 to an order preparation system 921.

The wave conveyor 906 for robotic sequencing can thus provide for fast movers that are inducted into inventory closest to the wave conveyor 906. Slow moving inventory is farther from the wave conveyor 906. Slow moving inventory is passed forward through rack positions. Cases from each level are placed into sequence in the buffer for that level (B1=Buffer position for level 1). Level release is timed to provide perfect sequence at the end of the conveyor. (L1, L2, L3 . . . are assigned and release at appropriate window).The wave conveyor 906 allows for specific sequencing of loads on the trunk conveyor without degradation of throughput. Applying this to robotic palletizing allows a perfect sequence to be delivered to a robot. Rates of up to 1,800 CPH have been simulated in perfect sequence. The wave can even support multiple orders being filled at the same time by separating during the pallet build operation or separated by conveyor divert to multiple robots or workstations.

Figure 10:
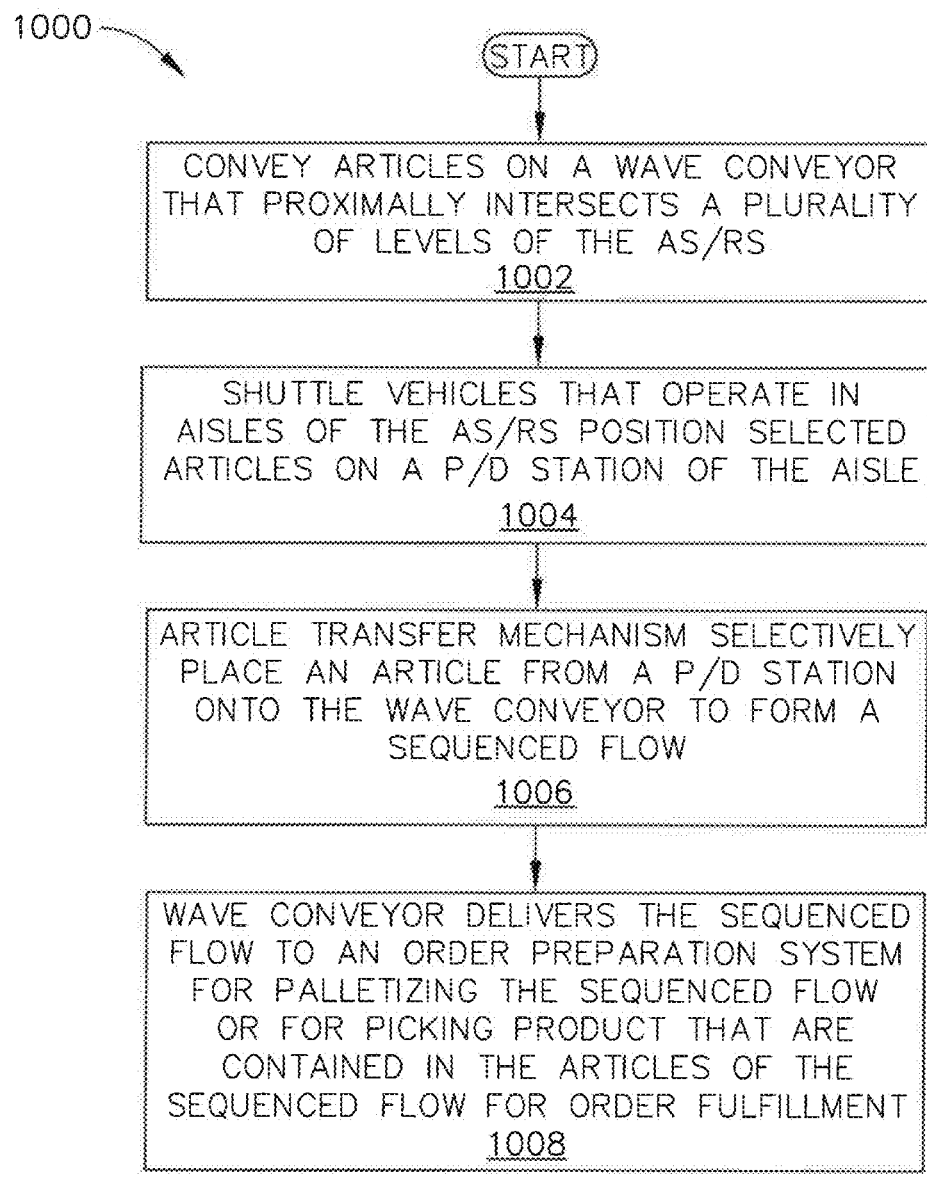
FIG. 10 illustrates a flow diagram of a method of sequencing articles from an AS/RS, according to one or more embodiments.

FIG. 10 illustrates a method 1000 of sequencing articles from an AS/RS of a material handling system. In one or more embodiments, the method 1000 includes conveying articles on a wave conveyor that proximally intersects a plurality of levels of the AS/RS (block 1002). The method 1000 includes shuttles that operate in aisles of the AS/RS positioning selected articles on a P/D station of the aisle (block 1004). The method 1000 includes an article transfer mechanism selectively placing an article from a P/D station onto the wave conveyor to form a sequenced flow (block 1006). The method 1000 includes delivering the sequenced flow to an order preparation system for palletizing the sequenced flow or for picking product that are contained in the articles of the sequenced flow for order fulfillment (block 1008). In one or more embodiments, the method 1000 includes replenishing the AS/RS from one of the wave conveyor and another wave conveyor that is offset from the wave conveyor and intersects the levels of the AS/RS.

In the above described flow chart of FIG. 10, one or more of the methods may be embodied in an automated controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Figure 11:
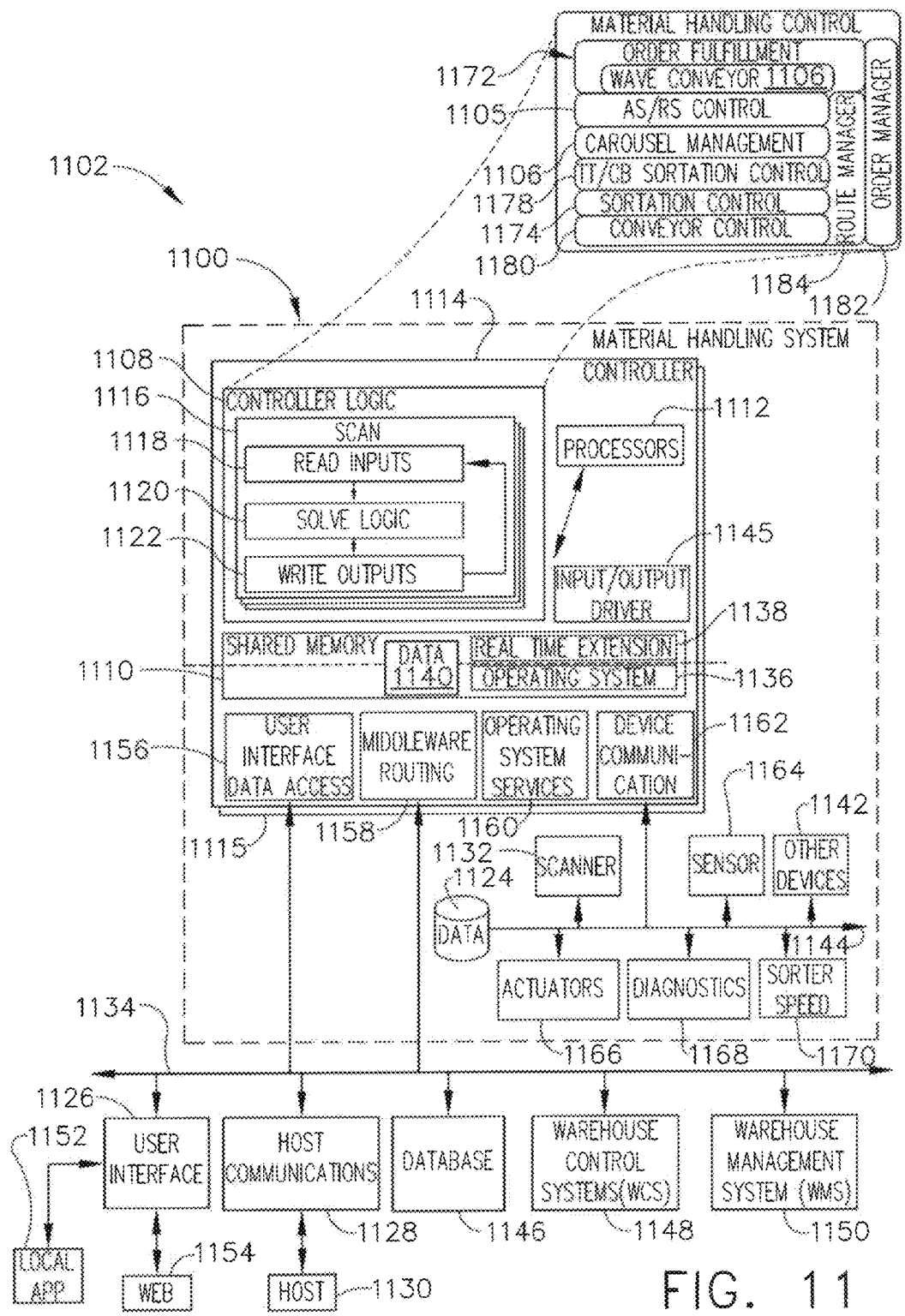
FIG. 11 illustrates a block diagram of an exemplary computing environment for executing the method of sequencing articles from an AS/RS, according to one or more embodiments.

In FIG. 11, an exemplary material handling system 1100 of a distribution center processing architecture 1102 is depicted wherein AS/RS wave control 1104 is implemented within an order fulfillment control 1105 that coordinates with an AS/RS control 1106. Controller logic 1108 stored in computer-readable, shared memory 1110 is executed by processors 1112 in a controller 1114 of the material handling system 1100. One function of the controller logic 1108 can be machine control logic. The controller 1114 can be a primary controller supported by a backup controller 1115 such that maintenance personal could swap cables or connections in the event of a failure without undue service downtime. Alternatively, a supervising system or the self-diagnostics could cause automatic switching between primary and backup in the event of a failure.

Scan logic, or merely a scan 1116, refers to an implementation within the controller logic 1108 wherein the processors 1112 repeatedly execute a read input component 1118, a solve logic component 1120, and a write outputs component 1122. By performing this sequence on a regular, periodic basis (deterministic), then the machine control logic can count scans to measure time. These three steps can be performed by a programmable logic controller (PLC), a personal computer (PC), a minicontroller, or microcontroller, etc. The solve logic component 1120 can incorporate IF-THEN-ELSE branching logic, motion control, simple to sophisticates, hardlined to configured. Data, used by the solve logic component 1120, can reside in the computer-readable, shared memory 1110 or a data store device 1124 (e.g., local, remote, cloud-based, etc.). A user interface 1126 can be used to modify the solve logic component 1120 such as by changing values that change the configuration or operation.

As is conventionally understood, the controller logic 1108 can receive binary type inputs (e.g., switches, photo eyes, etc.) and generate binary type outputs (e.g., motor contacts, solenoid valves, lamp actuations, etc.). For example, in such an implementation, the user interface 1126 can entail at least in part push button controls and lamps. More recent developments for controller logic 1108 can include RS232 serial devices with light emitting diode (LED), liquid crystal diode (LCD), cathode ray tube (CRT), etc., screens and keyboards that enable dialog screens and data display along with printers for generating reports. Barcode scanning can detect items processed by the material handling system 1100. More recently, wired and wireless communication within the material handling system 1100 and distribution center processing architecture 1102 enable more distributed and remotely isolated implementations. For example, such communication architectures may employ bus couplers such a PROFIBUS and ETHERCAT.

The scan 1116 can be one of many control scans to support increased speeds and complexities for portions of the material handling system 1100. Certain logic is required to be performed during shorter intervals than others and so the scans 1116 can have different periodicities, often selected for convenience to occur as multiples of the shortest duration scan 1116. Examples include scans 1116 of 1 ms and 2 ms for motion control, 11 ms for a merge subsystem, and 211 ms for general conveyor.

The material handling system 1100 can incorporate host communications 1128 to a host system 1130 using serial ports, Ethernet, file transfer protocol (FTP), Transfer Control Protocol/Internet Protocol (TCP/IP), etc. Thereby, the host system 1130 can make decisions for the material handling system 1100. For example, a scanner 1132 can see a barcode. The barcode is sent to the host system 1130, such as via a bridge 1134. The host system 1130 responds with a destination. In response, the material handling system 1100 causes the item with the barcode to go to that destination. Alternatively, the process can entail receiving a batch or download of destinations mapped to barcodes as part of a lookup table (LUT) for reference by the material handling system 1100.

The computer-readable shared memory 1110 can allow execution of an operating system (e.g., Windows, LINX, etc.) 1136 to execute with a real time extension 1138. The real time extension 1138 assures that the machine control logic (controller logic 1108) gets to execute completely on the time schedule required. Variations in the execution schedule are measured in microseconds. This approach assures the kind of precision required for the machine control while retaining access to the power and flexibility of a general purpose Operating system (e.g., Windows). PLCs, which can also be included for machine control, can operate in their own proprietary environments (hardware and software) and are integrated using communications. Data 1140 from these communications is stored in computer-readable shared memory 1110 for use in control decisions and for display on user interface 1126. In an exemplary version, the data 1140 is not controlled by the real time extension 1138. In a similar fashion, other communicating devices 1142 used in the control process (e.g., scales, printers) are connected via a private internal communications bus (e.g., Ethernet) 1144 to the processors 1112. The controller 1114 can also have internal input/output drivers 1145 to interface using specific communication protocols.

The distribution center processing architecture 1102 can include other systems external to the material handling system 1100 that communicate via the bridge 1134, such as a database 1146, a warehouse control system (WCS) 1148, and a warehouse management system (WMS) 1150. In addition, the user interface 1126 can facilitate remote or automated interaction via the user interface 1126, depicted as a local application 1152 and a web application 1154. The controller 1114 can include specific interfaces to support this interaction, such as a user interface data access component 1156 to interact with user interface 1126, middleware routing component 1158 to interface with other external systems. Operating system services 1160 and a device communication component 1162 can also support the communications, such as sensors 1164, actuators 1166, diagnostic systems 1168, and a sorter speed control 1170.

The controller logic 1108 can be functional described as material handling control layers 1172 of software functionality, such as sortation control 1174, that address certain subsystems within a distribution center: order fulfillment 1105, carousel management 1176, tilt tray/cross belt (TT/CB) control 1178, conveyor control 1180, order manager 1182 and route manager 1184.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

For example, running average carton length can be used. Then, after a reset, the expected average for the ten minute timer can be used. The same approach can be used for the one (1) minute average for recirculation. Alternatively or in addition, inter-slug gap can be considered in the calculation.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executes instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Figure 12:
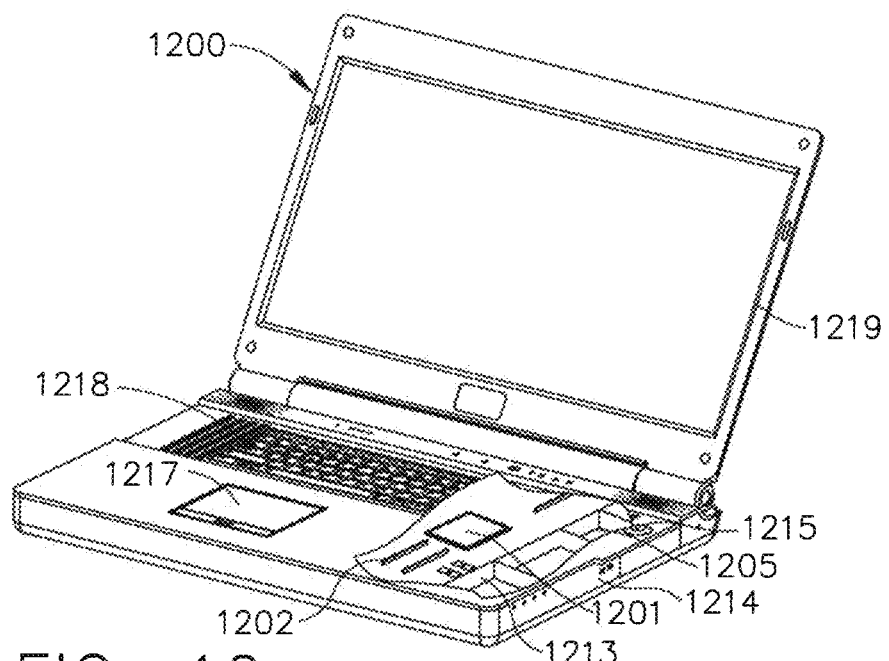
FIG. 12 illustrates a depiction of an isometric view of a laptop computer for executing instructions to perform sequencing articles from an AS/RS, according to one or more embodiments.

The various embodiments may be implemented in any of a variety of computing devices, an example of which is illustrated in FIG. 12. A computing device 1200 will typically include a processor 1201 coupled to volatile memory 1202 and a large capacity nonvolatile memory, such as a disk drive 1205 of Flash memory. The computing device 1200 may also include a floppy disc drive 1213 and a compact disc (CD) drive 1214 coupled to the processor 1201. The computing device 1200 may also include a number of connector ports 1215 coupled to the processor 1201 for establishing data connections or receiving external memory devices, such as a USB or FireWire™ connector sockets, or other network connection circuits for establishing network interface connections from the processor 1201 to a network or bus, such as a local area network coupled to other computers and servers, the Internet, the public switched telephone network, and/or a cellular data network. The computing device 1200 may also include the trackball or touch pad 1217, keyboard 1218, and display 1219 all coupled to the processor 1201.

Figure 13:
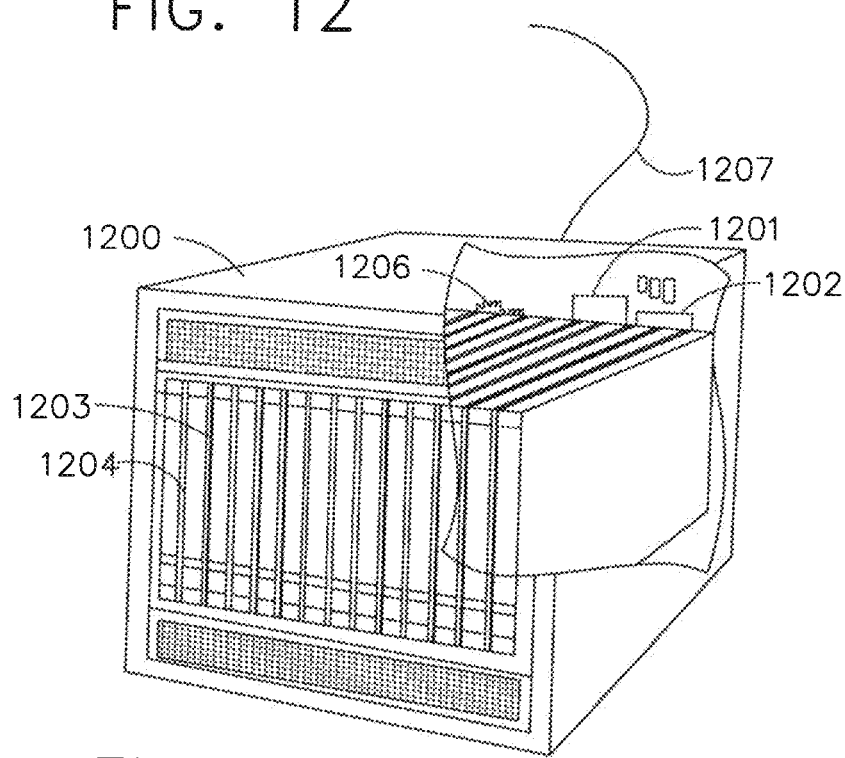
FIG. 13 illustrates a depiction of an isometric view of a server information handling system for executing instructions to perform sequencing articles from an AS/RS, according to one or more embodiments.
Figure 14D:
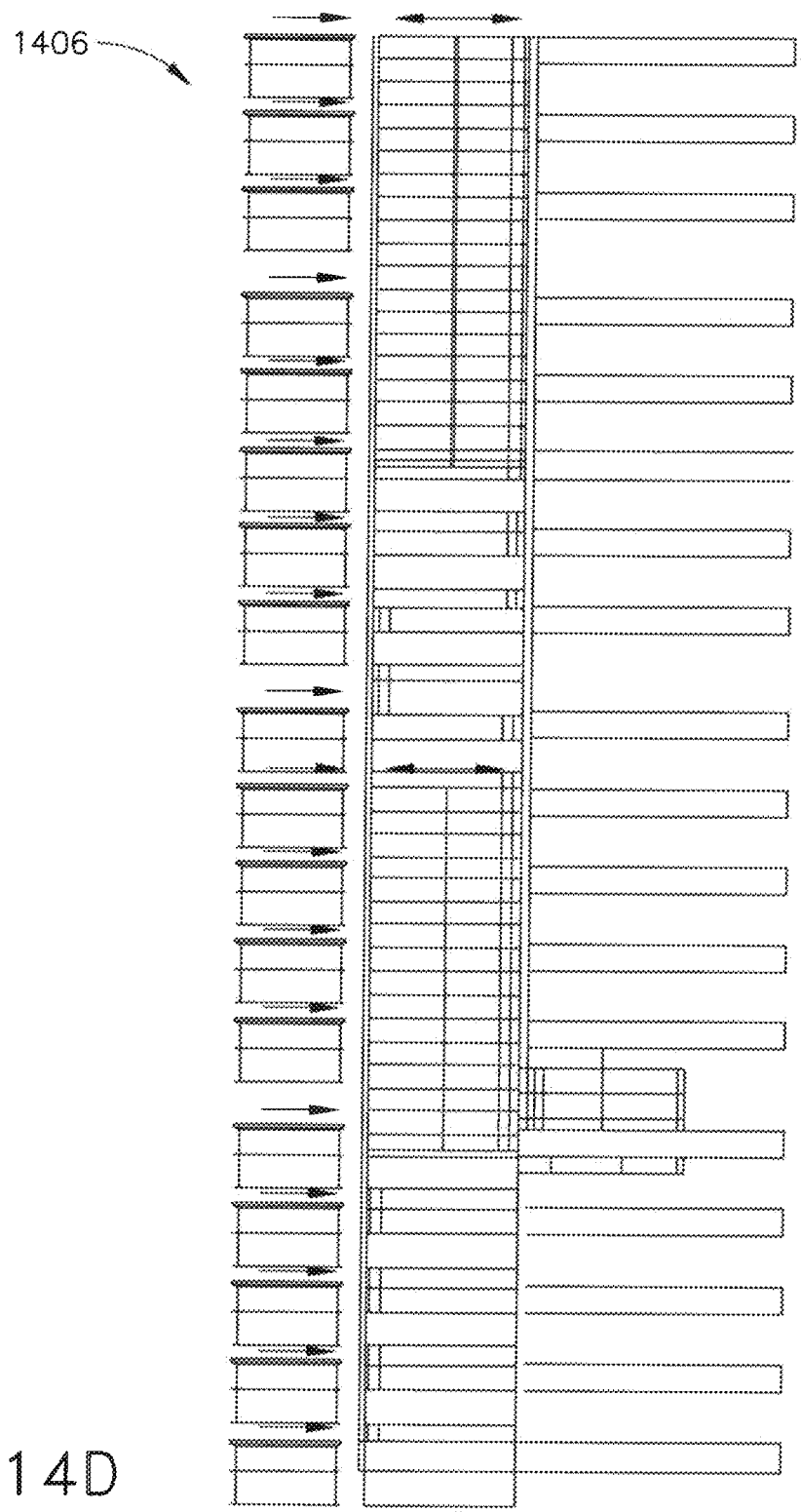

The various embodiments may also be implemented on any of a variety of commercially available server devices, such as the server 1300 illustrated in FIG. 13. Such a server 1300 typically includes a processor 1301 coupled to volatile memory 1302 and a large capacity nonvolatile memory, such as a disk drive 1303. The server 1300 may also include a floppy disc drive, compact disc (CD) or DVD disc drive 1304 coupled to the processor 1301. The server 1300 may also include network access ports 1306 coupled to the processor 1301 for establishing network interface connections with a network 1307, such as a local area network coupled to other computers and servers, the Internet, the public switched telephone network, and/or a cellular data network.

FIGS. 14A-14D illustrate a reduced length wave conveyor 1406 that is folded back at its midpoint in order to reduce by half its floor space longitudinal dimension for a given number of levels serviced. For clarity, only one fold back is depicted; however, more can be incorporated to service additional vertical levels.

Figure 15A:
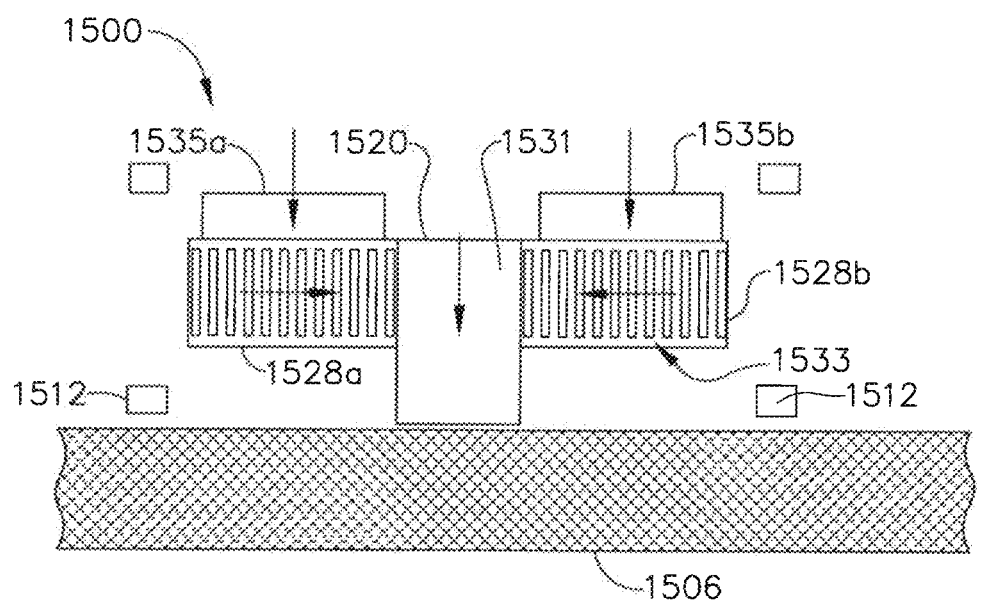
FIGS. 15A-15B illustrate top sequenced views of a P&D station of an example AS/RS that is flanked by left and right buffer location, according to one or more embodiments.
Figure 15B:
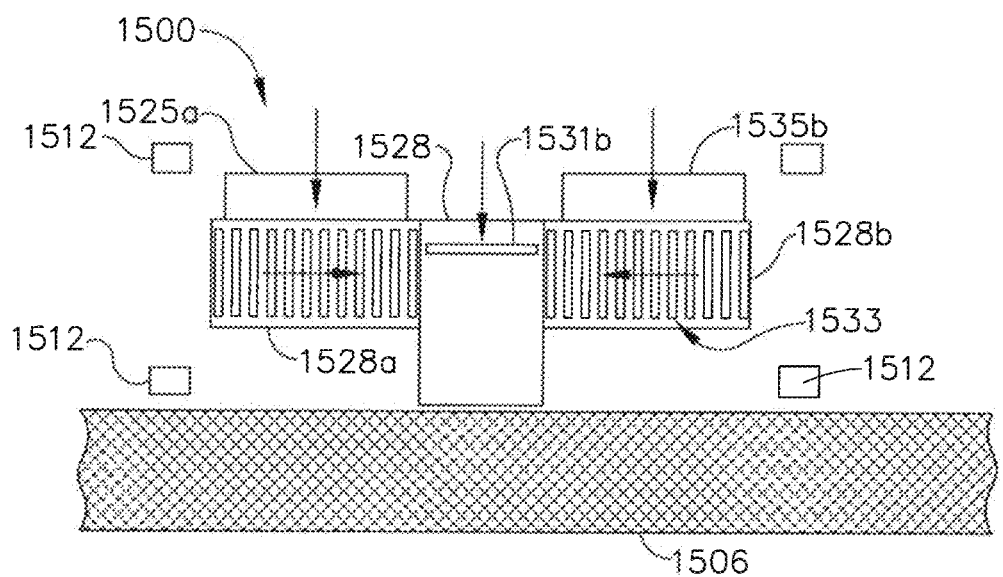
Figure 16A:
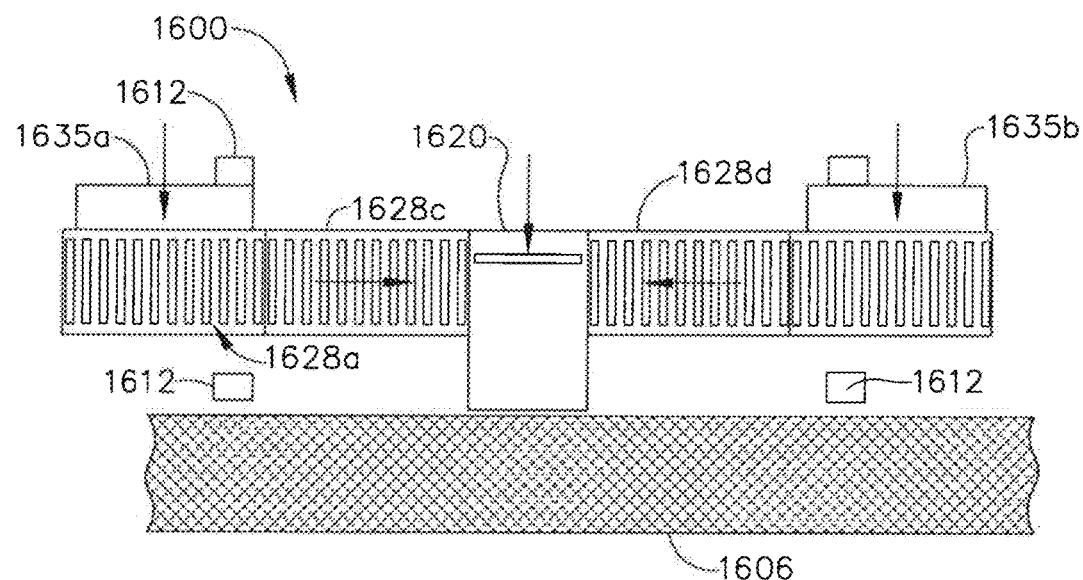
FIG. 16A illustrates a top diagrammatic view of another example AS/RS having additional intermediate buffer locations being used to sequence articles, according to one or more embodiments.
Figure 16B:
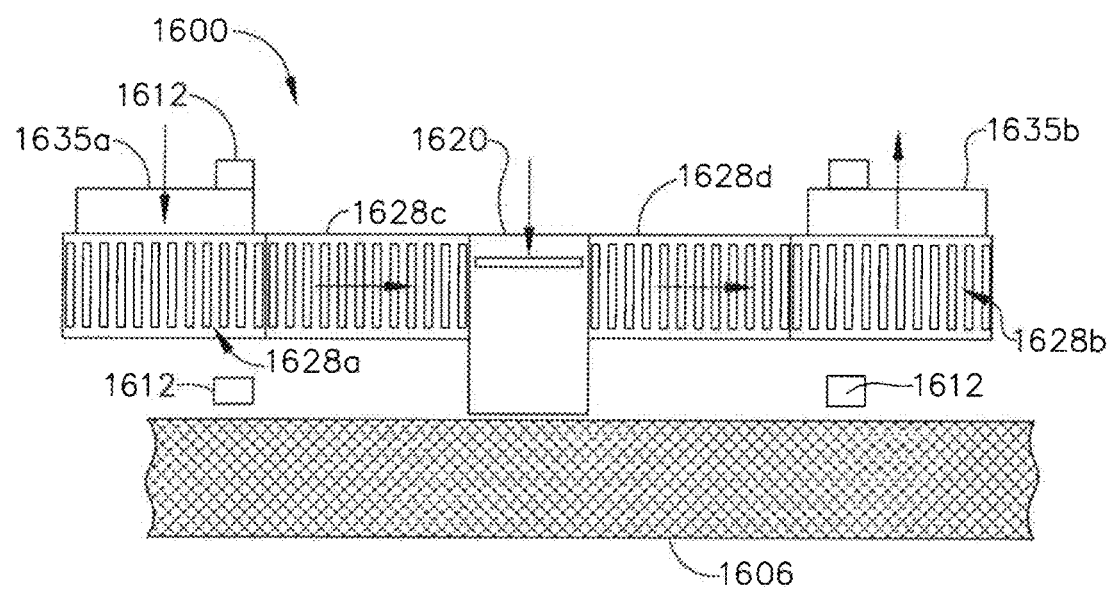
FIG. 16B illustrates a top diagrammatic view of the AS/RS of FIG. 16A having one buffer receiving replenishment articles, according to one or more embodiments.

FIGS. 15A-15B illustrate a P&D station 1520 of an AS/RS 1500 that is flanked by left and right buffer locations 1528a-1528b within a rack 1512. FIG. 15A illustrates an article transfer mechanism 1531a at the P&D station 1520 such as a right angle transfer with the buffer locations 1528a-1528b including motor driven rollers 1533. FIG. 15B illustrates an article transfer mechanism 1531b at the P&D station 1520 such as pusher. FIGS. 15A-15B include shuttle drops 1535a-1535b onto the left and right buffer locations 1528a-1528b, respectively. Articles are received on shuttle drops shuttle drops 1535a-1535b . FIG. 16A illustrates an AS/RS 1600 having left and right intermediate buffer locations 1628c-1628d inserted for additional buffering capacity that are flanked respectively by left and right buffer locations 1628a-1628b within a rack 1612. FIG. 16B illustrates the AS/RS 1600 having a right portion reversed in direction for replenishment with the left side continuing to sequence out for order fulfillment. Articles are received at the shuttle drops 1635a-1635b.

Figure 17:
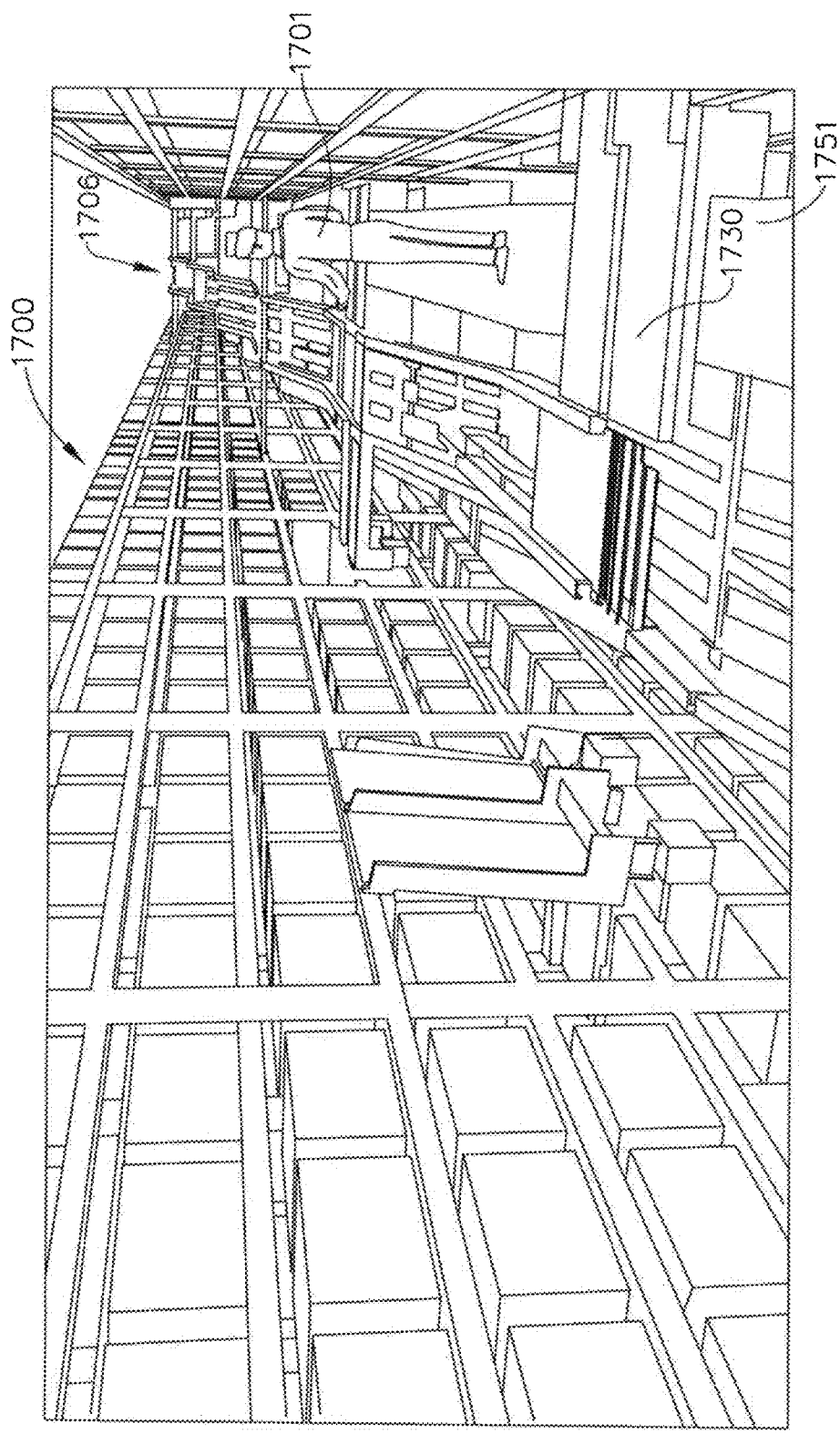
FIG. 17 illustrates an isometric view of an example AS/RS that includes hinged extender conveyors that transfer product to a wave conveyor, according to one or more embodiments.

FIG. 17 illustrates an AS/RS 1700 that includes a wave conveyor 1706. Access for a human operator 1701 is provided by hinged extender conveyors 1730 that can be flipped up to use an inclined catwalk 1751.

Figure 18:
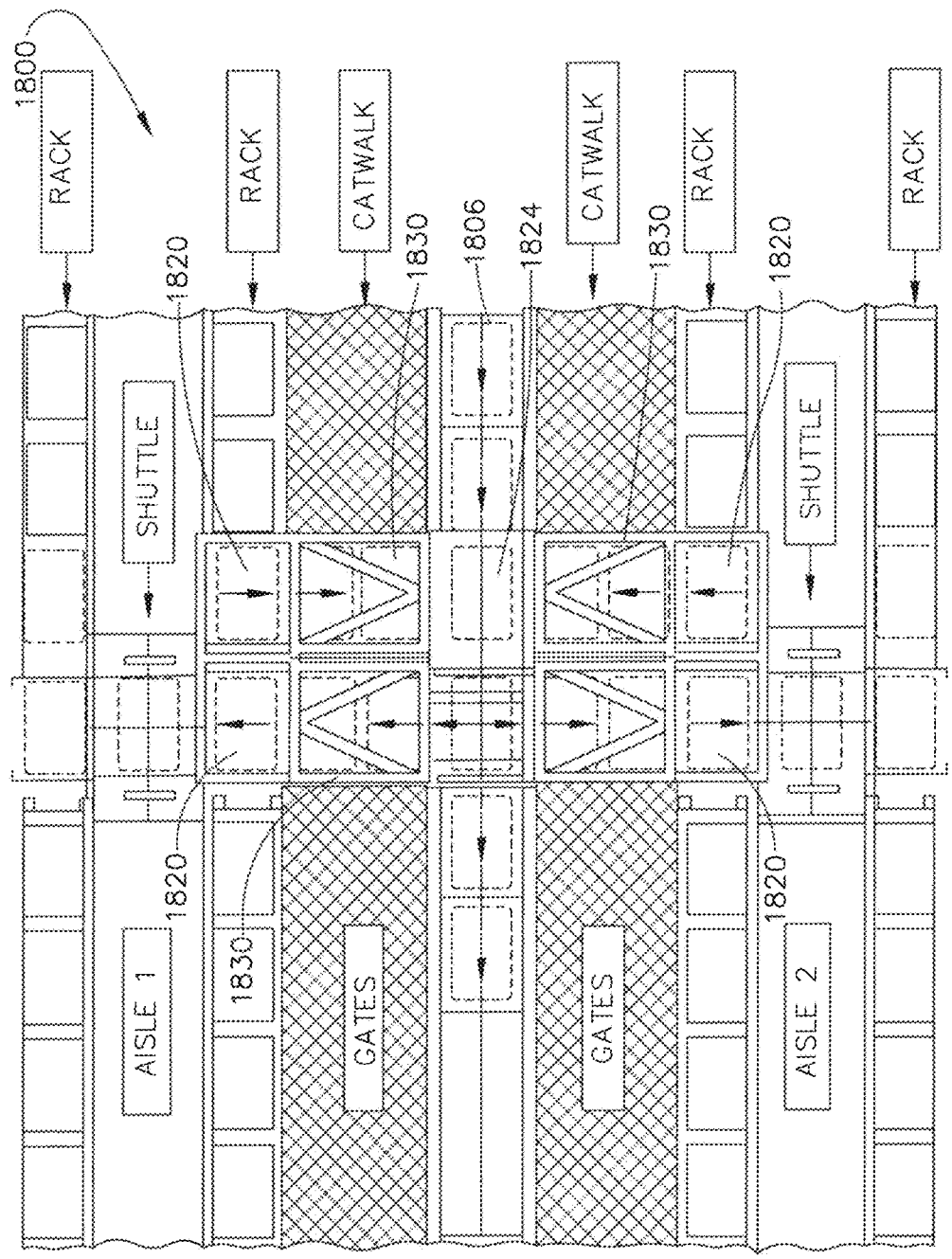
FIG. 18 illustrates a top diagrammatic view of an additional example AS/RS having a wave conveyor that interfaces to two independent in and out P&D stations at each level to simultaneously support both put into storage away and sequencing to an order fulfillment station, according to one or more embodiments.

FIG. 18 illustrates an AS/RS 1800 having a wave conveyor 1806 that interfaces to two independent in and out P&D stations 1820 at each level to simultaneously support both put into storage away and sequencing to an order fulfillment station. Each side of the wave conveyor 1806 includes hinged extender conveyors 1830 between flat transfer sections 1824 and the respective P&D stations 1820 that serve as operator gates.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A material handling system including an automated storage and retrieval system (AS/RS), the AS/RS comprising:
   vertically spaced levels storing articles and each level comprising a pickup and deposit (P/D) station that is horizontally positioned, wherein an arrangement of the P/D station in a sequence at each level collectively defines a ramped orientation;
   a first wave conveyor and a second wave conveyor in a stacked arrangement having the ramped orientation to move the articles selectively in at least one flow direction to a respective P/D station positioned at each level;
   a first subset of an article transfer mechanism to move the articles in a selected at least one direction from the first wave conveyor to a respective first P/D station at one level; and
   a second subset of the article transfer mechanism to move the articles from a respective second P/D station at another level onto the second wave conveyor;
   wherein each of the first wave conveyor and the second wave conveyor are separately folded back at their respective midpoints to reduce a longitudinal dimension for a given number of levels serviced.

2. The material handling system of claim 1, wherein the first subset of the article transfer mechanism and the second subset of the article transfer mechanism comprise at least one right angle transfer conveyor subsystem positioned to transfer either (a) an article between the first P/D station and a juxtaposed portion of the first wave conveyor or (b) another article between the second P/D station and a juxtaposed portion of the second wave conveyor.

3. The material handling system of claim 1, wherein the AS/RS comprises shuttles that move articles in aisles that each include a respective P/D station.

4. The material handling system of claim 3, further comprising a controller that executes instructions to:
   position selected articles on the respective P/D station by respective assigned shuttles;
   selectively move the selected articles onto the first wave conveyor and the second wave conveyor by respective article transfer mechanisms in coordination with movement of the first wave conveyor and the second wave conveyor to create a sequenced flow of selected articles.

5. The material handling system of claim 4, wherein:
   a selected aisle having a P/D station and inventory locations on one side has shared inventory locations on an opposite side that are serviced by a selected shuttle that services the selected aisle;
   the AS/RS has another aisle behind the shared inventory storage locations that is serviced by another shuttle, the other aisle having inventory storage locations on an opposite side to the shared inventory storage locations, and
   the controller:
     determines whether an article designated for delivery to the P/D station of the selected aisle is a slow mover;
     in response to determining that the article is a slow mover:
       directs the selected shuttle to move the article to a shared inventory location; and
       directs the other shuttle to move the article from the shared inventory location to an inventory storage location.

6. The material handling system of claim 5, wherein the controller, in response to determining that the article is not a slow mover, directs the selected shuttle to move the article to an inventory location.

7. The material handling system of claim 1, wherein each P/D station comprises more than one buffering position.

8. The material handling system of claim 1, wherein each of the first wave conveyor and the second wave conveyor are longitudinally offset to increase load clearances.

9. The material handling system of claim 1, further comprising:
   a hinged extender conveyor that transfer product to the first and second wave conveyor from their respective P/D station; and
   a catwalk that is transverse to the hinged extender conveyor.

* * * * *